(12) United States Patent
Fitz et al.

(10) Patent No.: US 6,520,596 B1
(45) Date of Patent: Feb. 18, 2003

(54) WHEEL SUPPORT ASSEMBLY AND HUB

(75) Inventors: Frank A. Fitz, Poway, CA (US);
Wayne K. Higashi, Los Gatos, CA (US)

(73) Assignee: Kohl Wheels, LLC, Los Gatos, CA (US)

( * ) Notice: Subject to any disclaimer, the term of this patent is extended or adjusted under 35 U.S.C. 154(b) by 0 days.

(21) Appl. No.: 09/911,956

(22) Filed: Jul. 25, 2001

(51) Int. Cl.$^7$ ................................................. B60B 3/10
(52) U.S. Cl. .................. 301/64.102; 301/66; 301/105.1
(58) Field of Search ........................ 301/64.101, 64.102, 301/64.704, 66, 79, 80, 64.201, 64.202, 64.203, 65, 105.1; 29/894.34, 894.344, 894.32

(56) References Cited

U.S. PATENT DOCUMENTS

| | | | | |
|---|---|---|---|---|
| 1,559,673 A | * | 11/1925 | Carnahan | 301/80 |
| 1,635,490 A | * | 7/1927 | Meldrum | 29/894.34 |
| 1,737,935 A | * | 12/1929 | Meldrum | 301/67 |
| 1,993,563 A | * | 3/1935 | Miller et al. | 301/65 |
| 2,272,962 A | * | 2/1942 | Tatter et al. | 301/64.305 |
| 2,890,911 A | * | 6/1959 | Schilberg | 301/104 |
| 3,950,033 A | * | 4/1976 | Wilcox | 29/894.344 |
| 4,173,374 A | * | 11/1979 | Resele et al. | 301/35.59 |
| 4,256,346 A | * | 3/1981 | Kawaguchi et al. | 301/66 |
| 6,042,194 A | * | 3/2000 | Fitz et al. | 29/894.34 |
| 6,196,638 B1 | * | 3/2001 | Mizuno et al. | 301/104 |

* cited by examiner

Primary Examiner—S. Joseph Morano
Assistant Examiner—Long Bao Nguyen
(74) Attorney, Agent, or Firm—Steve Shear

(57) ABSTRACT

A hub for use in and as part of a wheel support assembly adapted to bolt to the end plate of an axle of a vehicle for supporting a tire is disclosed herein along with the wheel support assembly itself. The hub is configured as a plurality of bars which are connected together to form a hub body. This hub body defines a common center point and a contact face. The contact face is where the hub is in contact with the axle end plate when the device is mounted to a vehicle. Each of the bars has on one side a contact surface, and a through hole for receiving an axle lug bolt. The contact surface on each of the bars has a curved shape on its outwardly most extending end, the curvature of which is defined by a radius less than the distance between the common center point of the hub body and the outwardly most extending end of the bars.

17 Claims, 3 Drawing Sheets

WHEEL SUPPORT ASSEMBLY AND HUB

BACKGROUND

The present invention relates generally to wheel support assemblies for vehicular tires and more particularly to the center hub portion thereof, especially one of the design disclosed in Assignee's Fitz et al U.S. Pat. No. 6,042,194 which is incorporated herein by reference.

An overall wheel structure or wheel support assembly is designed to be mounted to the end plate of a vehicular axle and typically includes a hub as well as an arrangement of spokes and a rim for receiving a tire. The hub itself typically includes an arrangement of bars which have outwardly-most extending ends and which are connected to one another to form a hub body. The hub body, in turn, defines (1) a common center point and (2) an overall contact face defined in part by the bars.

In the past, there has not been much consideration given to the shape of the hub, much less the area that is in contact with the end plate of a vehicle's axle. Others have taken it for granted that any shape that has holes for the lug bolts will suffice as long as there is sufficient material to bolt to. As will be seen hereinafter, this has led to the previous designs that have shapes on the ends of the bars which are not so rounded and which define a relatively large radius substantially equal to the distance from the center of the hub to the ends of the bars. Applicants have discovered that this configuration leads to very high peak stresses in the material, and makes the use of relatively ordinary carbon steel difficult if not impossible.

SUMMARY

The present invention overcomes or at least reduces the stress problems just mentioned by providing a hub designed in accordance with the present invention. The hub, as will be seen, comprising: a plurality of bars which have outwardly-most extending ends, each end of which displays a predetermined curvature. the bars being connected to one another to form a hub body defining (1) a common center point and (2) an overall contact face defined in part by said bars; the contact face including outwardly-most extending ends corresponding to the ends of the bars and displaying predetermined curvatures corresponding to the outwardly-most extending ends of the bars, the predetermined curvatures of the ends of said contact face displaying radii of curvature smaller than the distance from said center point of the contact surface to the outwardly-most extending ends of said bars; each of the bars having a through hole (1) which is adapted to receive an axle bolt and (2) which extends in a direction perpendicular to said contact face such that, when the wheel structure is mounted to said vehicular axle, the contact surface is contiguous with the axle end plate.

As a specific example, applicants have discovered that by reducing the radius of curvature of the ends of the bars there is a significant reduction in the peak stresses in the material. Peak stresses were reduced analytically by as much as 32% over the previous design. A design that can reduce these peak pressures could allow the use of lighter or less expensive materials. Lighter materials would make assembly by stamp forming the hub assembly from a single sheet of material easier thereby possibly making the cost of the assembly go down, and at the same time, a lighter assembly will also make a vehicle more fuel efficient. Another advantage of a stress reducing design is that the wheel assembly can yield higher performance without adding weight.

BRIEF DESCRIPTION OF THE DRAWINGS

The various diagrams of the present invention and prior art are described briefly below.

DETAILED DESCRIPTION

Figure 1:
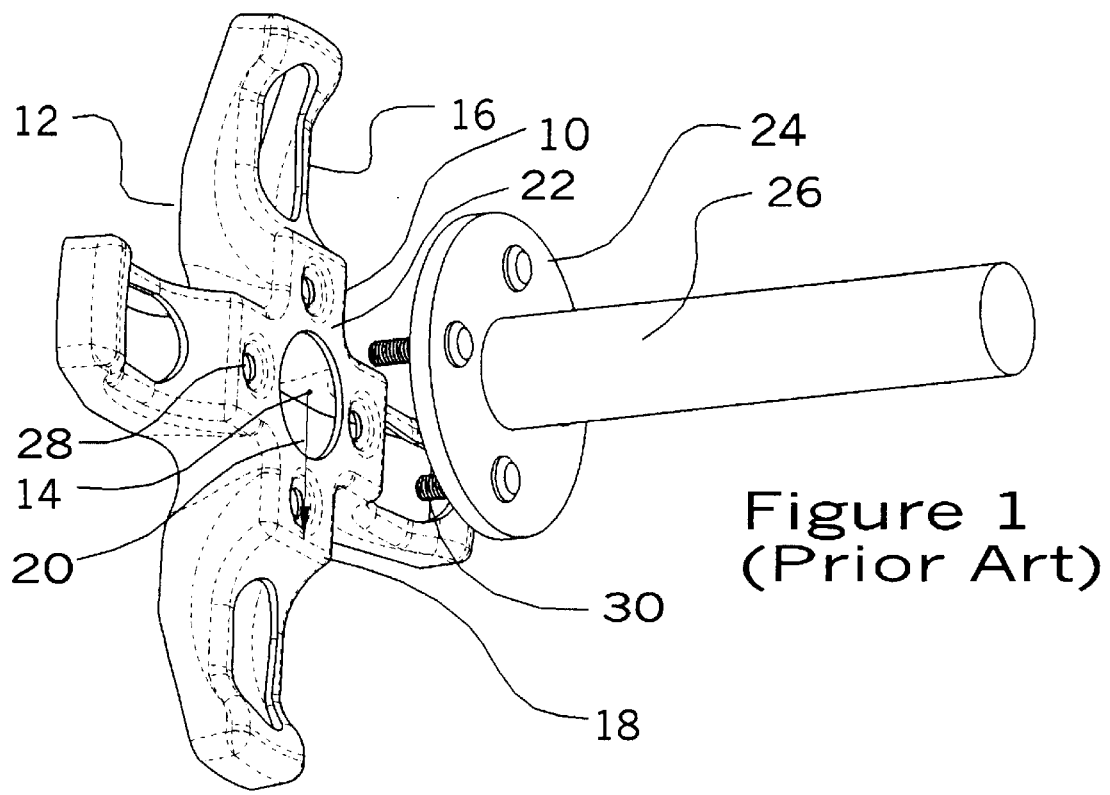
FIG. 1 is an isometric view of one embodiment of a prior art hub and spokes with a vehicular axle assembly.

By Turning now to the drawings, wherein like components are designated by like reference numerals throughout the various figures, attention is first directed to FIG. 1, which is exemplary of the prior art. In this diagram, an existing hub body 10 comprising four existing bars 12 is arranged such that it defines a common center point 14. In this figure, there are spoke arrangements 16 extending from the existing hub body 10 at the outwardly most extending ends 18 of hub 10 and they are either formed from the same piece of material or have been attached to the existing hub body 10 by some suitable means. These spoke arrangements 16 are designed such that they can be attached to an outer rim assembly (not shown) for receiving a tire. A distance 20 is shown extending from the common center point 14 to the outwardly most extending end 18 of one of the existing bars 12. This distance 20 is equal for all of the four existing bars 12 shown in FIG. 1 and, as will be seen hereinafter, this is true for the similar components in FIG. 2. With particular regard to the ends 18, note that they are for the most part flat and define virtually no radius of curvature.

There is also shown in FIG. 1 a contact face 22 on one side of the hub body 10 and this contact face, which includes the straight edges of flat ends 18, contacts an axle end plate 24 when the hub body 10 is mounted to a vehicular axle 26. Mounting to the vehicular axle is accomplished via through holes or lug holes 28 in the existing bars 12 through which axle lugs 30 are inserted and secured with nuts (not shown).

Figure 2:
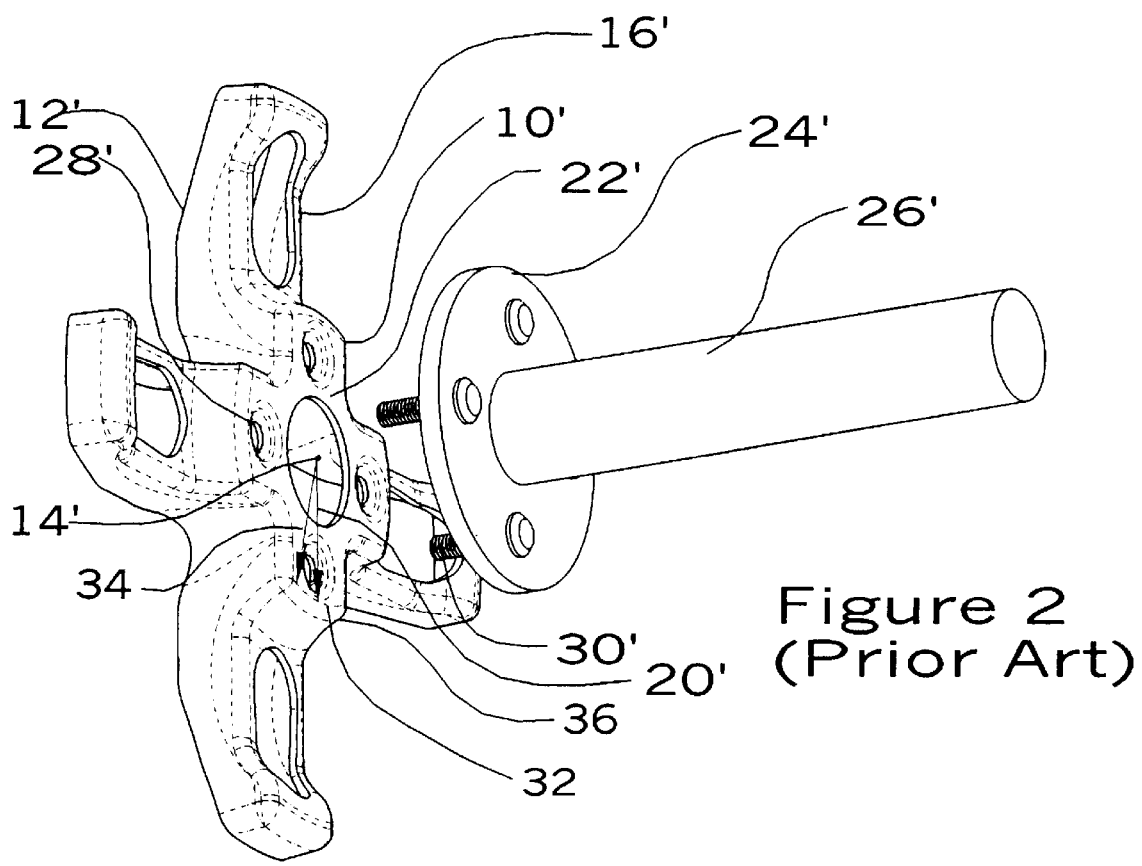
FIG. 2 is an isometric view of another embodiment of a prior art hub and spokes.

Turning now to FIG. 2 we see that this embodiment 10' of the prior art is similar to FIG. 1 except that the outwardly most extending ends 36 of the bars 12' now show an existing curvature 32. A radius 34 equal to the distance 20' is shown starting at the common center point 14' and defines curvature 32. When the existing radius 34 is rotated through 360 degrees it is collinear with the outwardly most extending ends 36 of all the existing bars 12'. It is not know by applicants whether this radius of curvature was purposely selected or not and, if it was, it is not known by applicants whether such a selection was for functional or aesthetic reasons.

Figure 3:
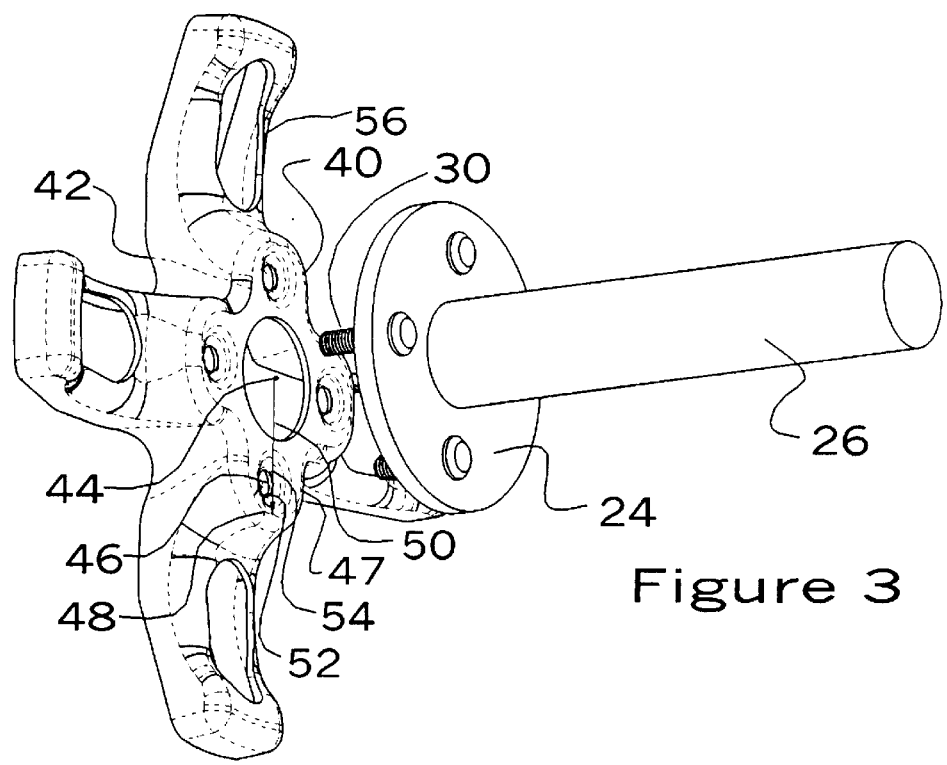
FIG. 3 is an isometric view of the hub and spokes of one embodiment of the present invention with a vehicular axle assembly.

Turning now to FIG. 3, there is shown a hub body 40 designed in accordance with the present invention and spokes 56, both of which form part of an overall wheel support structure or assembly. As can be seen, the hub body 40 is generally formed by a plurality of bars 42 which come together to define a common center point 44 and which respectively include their own lug holes 52. Extending from hub body 40 are spokes 56 for attaching to a rim assembly (not shown).

What is new and beneficial about hub body 40 is the degree to which the ends 47 of the bars 42 are purposely curved so as to define a radius 46 of curvature which extends, towards but stops short of center point 44, stopping at radius endpoint 54, so as to define a predetermined curvature 48 which is more extreme than the corresponding curvature in the prior art hub of FIG. 2. In a preferred embodiment, each radius 46 extends from an associated end 47 to approximately the center of its associated lug hole 52 such that predetermined curvature 48 is concentric or approximately concentric with its associated lug hole 52, where lug hole 52 is configured for receiving an axle lug bolt (30).

Applicants have found that by purposely making the ends of the bars in this more curvilinear fashion, they improve the overall structural integrity of the hub itself. In particular, by making the hub body such that the ends of the bars are not squared off and flat or merely mildly curved, as in the prior art, peak stresses in the material are significantly reduced. This new hub shape allows the manufacturer to construct the hub with a low mass while still achieving the required performance. Experimental results have clearly shown a significant decrease in the peak stresses experienced by the material used to form the hub when the new hub configuration is used. And, while the exact optimal length of radius 46 has not yet been determined, experimental results have shown that a beneficial reduction in peak stresses occurs when radius 46 is approximately half of the length of distance 50. In this latter regard, an important aspect of the present invention is the recognition of the relationship between the hub curvature we are talking about here and peak stresses. Specifically, by for example, reducing the radius 34 shown in the prior art hub 10' to, for example, radius 46 in FIG. 3 or radius 60 in FIG. 4 or the radii shown in FIGS. 5, 6 or 7, we will reduce the stresses in question. By recognizing this relationship, optimal curvature can be established for a given hub design. This is particularly true for the wheel disclosed in Fitz et al U.S. Pat. No. 6,042,194 and it is to be understood, that the hubs of the present invention can be made in the manner disclosed in Fitz et al, for example of stamped sheet metal.

Figure 4:
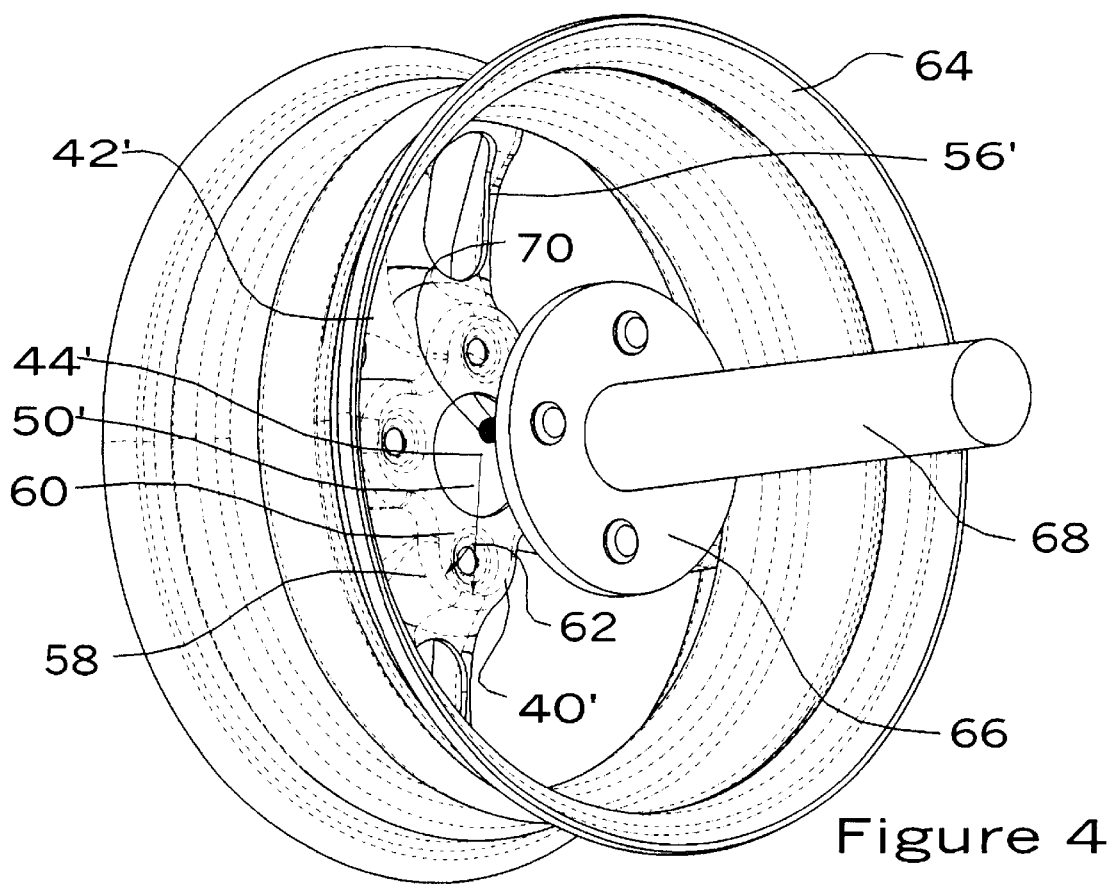
FIG. 4 illustrates the new design of the hub along with spokes, a rim for receiving a tire, and a vehicular axle assembly.

FIG. 4 shows another embodiment of the present invention with the bars 42' having a predetermined curvature 58. Second radius endpoint 62 is closer to through hole 52' and radius 60 defines predetermined curvature 58 by sweeping around second radius endpoint 62. FIG. 4 also illustrates a rim assembly 64 that attaches to spokes 56' so that a tire (not shown) can be mounted. An axle end plate 66, mounted to an axle 68, has a number of lugs 70 for mounting hub body 40' to a vehicle (not shown).

Figure 5:
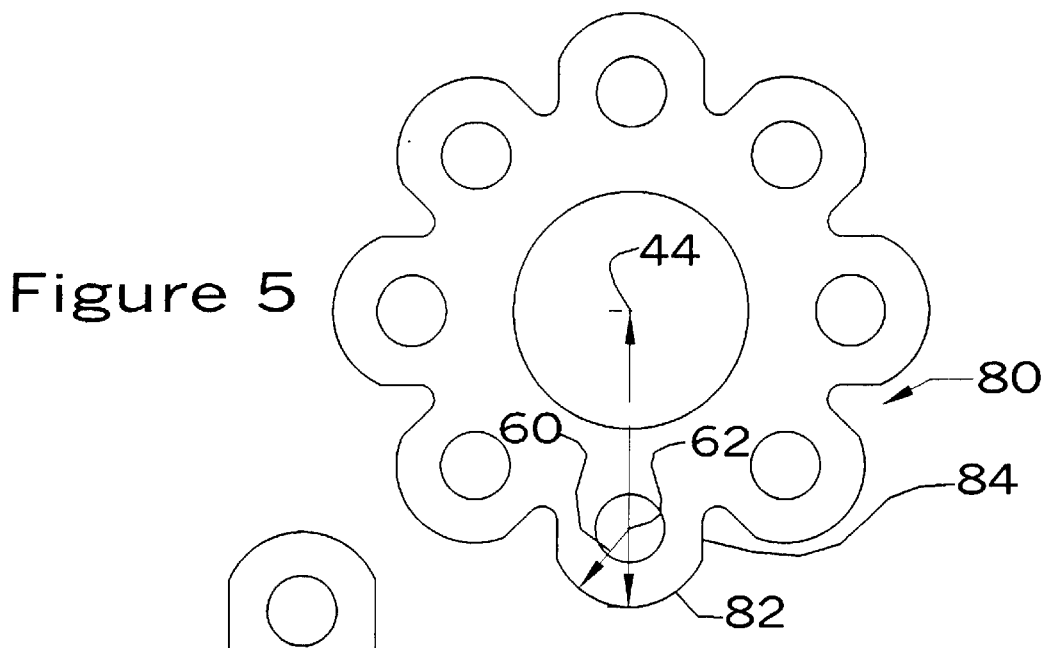
FIG. 5 illustrates one embodiment of the new hub assembly design with through holes for eight lug nuts.
Figure 6:
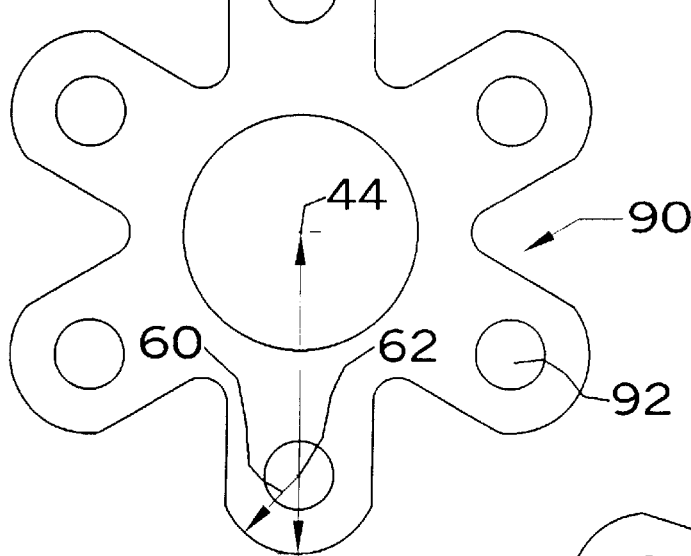
FIG. 6 illustrates another embodiment of the new hub assembly design with through holes for six lug nuts.
Figure 7:
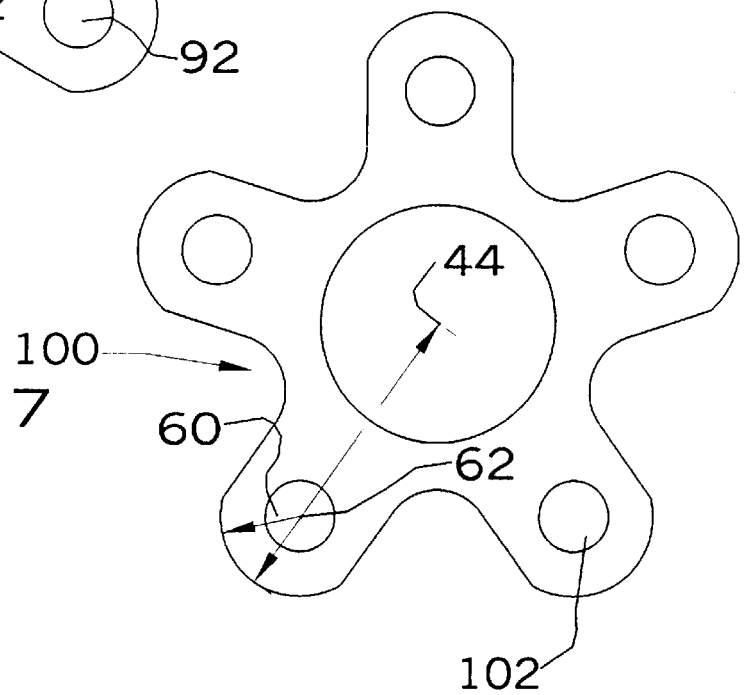
FIG. 7 illustrates a last embodiment of the new hub assembly design with through holes for five lug nuts.

Other embodiments of the present invention are shown in FIGS. 5, 6, and 7. FIG. 5 represents a hub body 80 for use with an eight lug axle (not shown), typical in larger vehicles such as heavy-duty pickups. As we can see, all of the bars 82 display a predetermined curvature 84, the shape of which reduces the peak stresses when the hub is mounted to a vehicle. FIG. 6 is the plan view of a six hole hub body 90 with six lug holes 92, and FIG. 7 is a hub body 100 with five through holes 102 for receiving lug bolts (not shown). These plan views represent hub body arrangements to match the lug bolt patterns of different vehicle sizes made by different manufacturers.

What is claimed is:

1. A hub for use as part of an overall wheel structure adapted to be mounted to the end plate of a vehicular axle, said wheel structure also having an arrangement of spokes and a rim for receiving a tire, said hub comprising: a plurality of bars which have outwardly-most extending ends, each end of which displays a predetermined curvature, said bars being connected to one another to form a hub body defining (1) a common center point and (2) an overall contact face defined in part by said bars; the contact face including outwardly-most extending ends corresponding to the ends of said bars and displaying predetermined curvatures corresponding to the outwardly-most extending ends of said bars, the predetermined curvatures of the ends of said contact face displaying radii of curvature smaller than the distance from said center point of the contact surface to the outwardly-most extending ends of said bars; each of said bars having a through hole (1) which is adapted to receive an axle bolt and (2) which extends in a direction perpendicular to said contact face such that, when the wheel structure is mounted to said vehicular axle, said contact surface is contiguous with the axle end plate.

2. A hub according to claim 1 wherein the radius of curvature displayed by each of the outwardly-most extending ends of said contact surface is substantially equal to the distance between the ends of its corresponding bar and a point on the latter's through hole.

3. A hub according to claim 1 wherein the radius of curvature displayed by each of the outwardly-most extending ends of said contact surface is substantially equal to one-half the distance between the ends of its corresponding bar and the common center point.

4. A hub according to claim 1 wherein there are four bars connected together to form said hub.

5. A hub according to claim 1 wherein there are five bars connected together to form said hub.

6. A hub according to claim 1 wherein there are six bars connected together to form said hub.

7. A hub according to claim 1 wherein there are eight bars connected together to form said hub.

8. A hub according to claim 1 wherein said hub is form ed from a single sheet of metal.

9. A wheel support assembly adapted to bolt to a vehicle axle for supporting a tire, said assembly comprising:
 a) an outer annular rim having an outer annular surface configured to support a tire and an inner annular surface;
 b) a hub adapted to mount to the end plate of a vehicular axle, said hub having a plurality of bars which have outwardly-most extending ends, each end of which displays a predetermined curvature, said bars being connected to one another to form a hub body defining (1) a common center point and (2) an overall contact face defined in part by said bars; the contact face including outwardly-most extending ends corresponding to the ends of said bars and displaying predetermined curvatures corresponding to the outwardly-most extending ends of said bars, the predetermined curvatures of the ends of said contact face displaying radii of curvature smaller than the distance from said center point of the contact surface to the outwardly-most extending ends of said bars; each of said bars having a through hole (1) which is adapted to receive an axle bolt and (2) which extends in a direction perpendicular to said contact face such that, when the wheel structure is mounted to said vehicular axle, said contact surface is contiguous with the axle end plate; and c) a plurality of spoke arrangements each having an outer end and a inner end said outer end adapted to connect to said rim, and said inner end adapted to connect to said hub.

10. A wheel support assembly according to claim 9 wherein the radius of curvature displayed by each of the outwardly-most extending ends of said contact surface is substantially equal to the distance between the ends of its corresponding bar and a point on the latter's through hole.

11. A hub according to claim 9 wherein the radius of curvature displayed by each of the outwardly-most extending ends of said contact surface is substantially equal to one-half the distance between the ends of its corresponding bar and the common center point.

12. A wheel support assembly according to claim 9 wherein there are four bars connected together to form said hub.

13. A wheel support assembly according to claim 9 wherein there are five bars connected together to form said hub.

14. A wheel support assembly according to claim 9 wherein there are six bars connected together to form said hub.

15. A wheel support assembly according to claim 9 wherein there are eight bars connected together to form said hub.

16. A wheel support assembly according to claim 9 wherein said hub is formed from a single sheet of metal.

17. A wheel support assembly according to claim 8 wherein said hub and plurality of spoke arrangements are formed from a single sheet of metal.

* * * * *